May 27, 1969
M. R. WALL
3,446,013
METHOD OF AND APPARATUS FOR INCREASING THE
EFFICIENCY OF COMBUSTION ENGINES
Filed April 18, 1967
Sheet 2 of 4
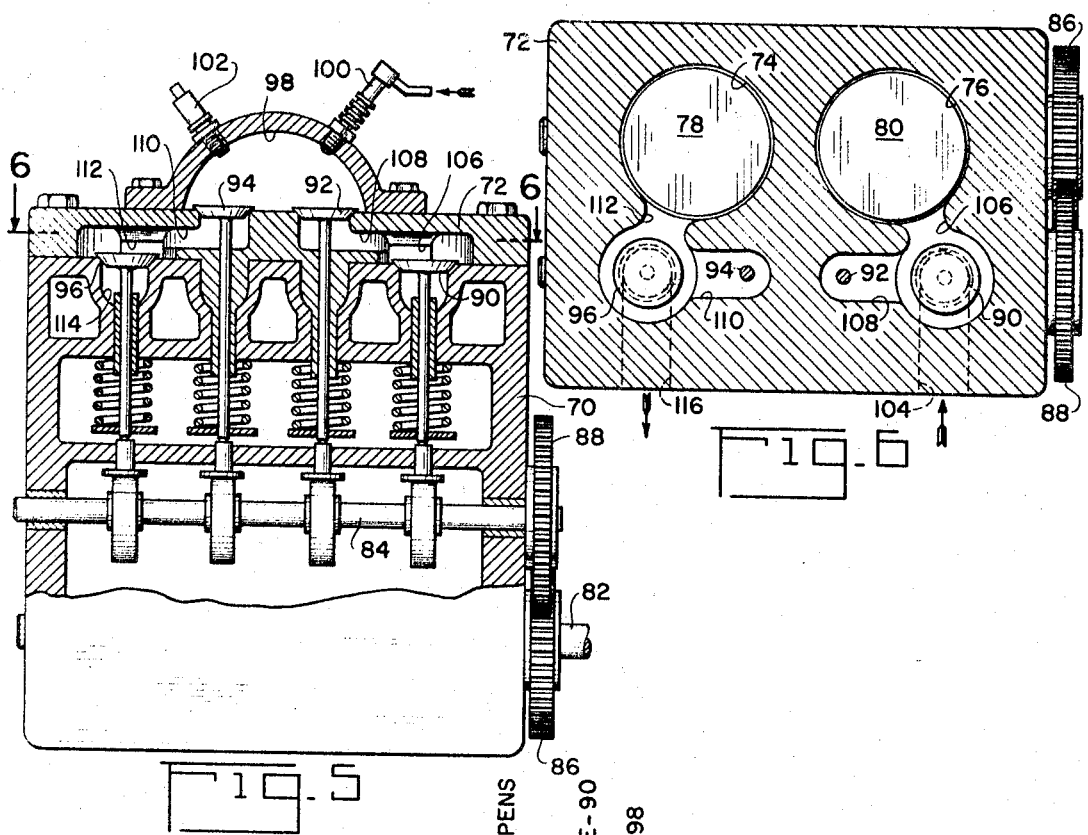
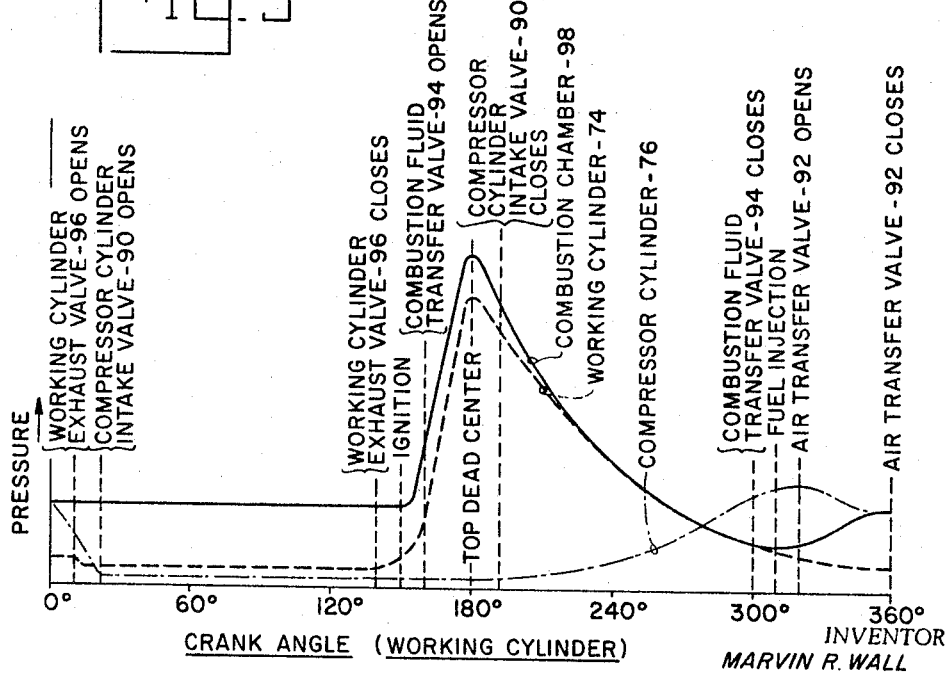
INVENTOR
MARVIN R. WALL
BY

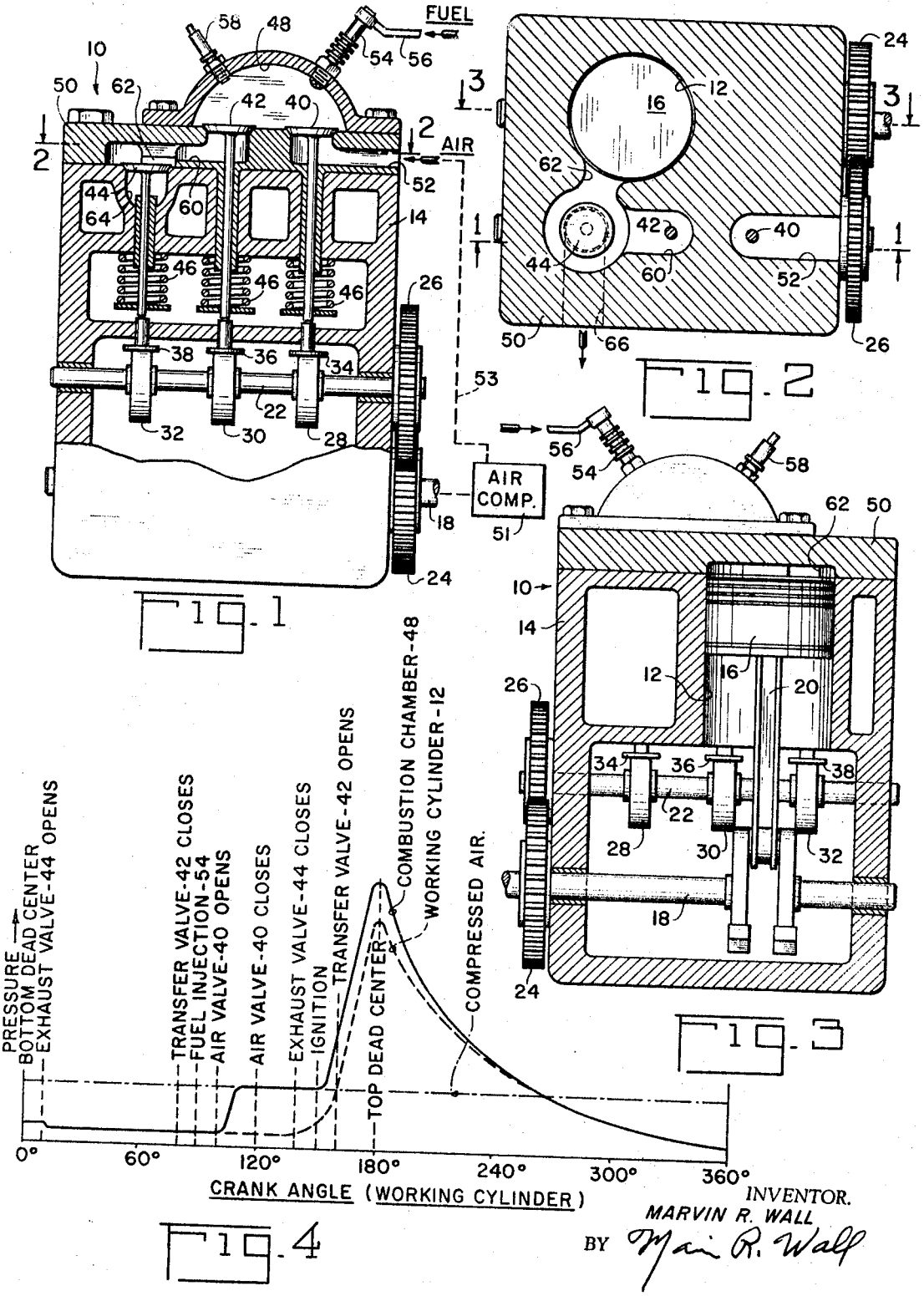

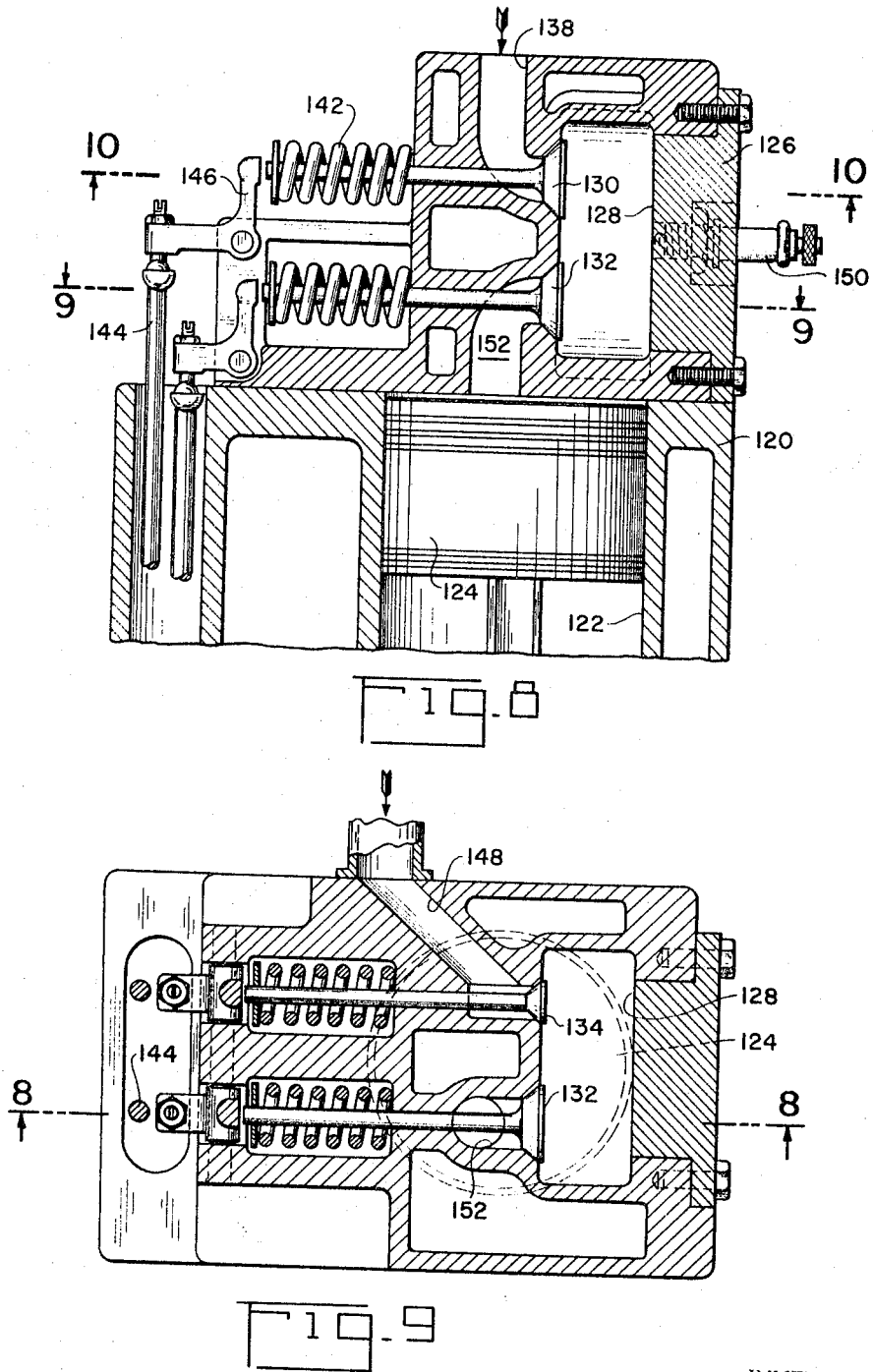

United States Patent Office 3,446,013
Patented May 27, 1969

3,446,013
METHOD OF AND APPARATUS FOR INCREASING THE EFFICIENCY OF COMBUSTION ENGINES
Marvin R. Wall, P.O. Box 6851, Tulsa, Okla. 74156
Filed Apr. 18, 1967, Ser. No. 636,565
Int. Cl. F02g 3/02
U.S. Cl. 60—39.06
15 Claims

ABSTRACT OF THE DISCLOSURE

A new thermodynamic cycle concept involving a chemical combustion process of steps: (1) spontaneous ignition of the entire fuel charge, at high temperature (450–550° C.), of the combustion chamber wall, to reduce ignition lag and insure complete combustion of smog-producing hydrocarbon exhaust emissions; (2) by spontaneous ignition, control detonation, with its associated high temperature, (2500–4000° C.), and in combination control the combustion temperature, by expansion during combustion, to establish the combustion temperature below the dissociation temperature (2700–4700° C.), of the burning gases, to control formation of flame-formed nitrogen oxide exhaust emissions; (3) provide additional working fluid expansion to increase thermal efficiency. The teaching is particularly applicable to reciprocating combustion engines having an external combustion chamber, where expansion may occur between the combustion chamber and working cylinder during the combustion process.

---

This invention relates to combustion engines and is more particularly directed to a new and improved cycle for a combustion engine and to a novel method of operating a combustion engine.

In a combustion engine, heat is added to the working fluid and this heat energy is converted by the engine into mechanical energy. Accordingly, the output of a combustion engine, in addition to other factors, depends on the efficiency of the conversion of this heat energy into mechanical energy—that is, on the thermal efficiency of the engine cycle. It is an object of this invention to provide a novel combustion engine cycle whereby the thermal efficiency of the engine is increased.

The cycles of the working fluid of modern reciprocating-type combustion engines are based on, and in effect are, the combination of two theoretical cycles: (1) in which heat is added to the working fluid under substantially-constant pressure and (2) in which heat is added to the working fluid under substantially-constant volume. It may readily be shown that, in conventional reciprocating-type combustion engines—that is, in those having the same expansion and compression ratio, the theoretical thermal efficiency of a cycle in which heat is added at constant volume is substantially in excess of the efficiency of a cycle having the same expansion ratio and in which heat is added at constant pressure. However, in the constant volume cycle, the maximum pressure and temperature of the working fluid are relatively high thereby limiting the practical application of this cycle. With the present invention, a working fluid cycle is provided for a combustion engine, which cycle approaches the efficiency of the theoretical constant volume cycle without subjecting the working piston to the maximum pressure and temperature present in the theoretial constant volume cycle.

Another problem present in existing combustion engines is ignition lag. In a conventional reciprocating-type combustion engine, fuel ignition occurs in the working cylinder and therefore its timing is adjusted so that a sufficient time interval occurs ahead of the top-dead-center position of the associated working piston to take into account the time lag between the fuel ignition and the resulting pressure rise in the working fluid. This lag is a function of the particular fuel, combustion chamber temperature and pressure, fuel-air ratio used and, in terms of the crank angle, the magnitude of this lag also depends on engine speed. With the present invention ignition lag is reduced by initiating combustion in a separate combustion chamber, which is operated at a temperature above the spontaneous ignition temperature of the fuel and with a relatively high fuel-air ratio, thence opening a valve and continuing combustion in a working cylinder containing additional air. Fuel is thereby burned more completely, reducing unburned hydrocarbons in the exhaust, thus reducing smog formation. Accordingly, it is a further object of this invention to provide a combustion engine cycle in which the problems resulting from ignition lag and smog formation are nonexistent.

Present combustion engines burn fuel in a working cylinder at substantially constant volume. The fuel may burn so rapidly the temperature of reaction is high enough to cause dissociation of some of the products until an equilibrium is established between the tendency to dissociate and recombine at the equilibrium temperature. This results in ignition lag and incomplete combustion with resulting engine inefficiency and smog formation. In the present invention, dissociation is controlled by controlling the combustion temperature by expanding the burning mixture into the working cylinder clearance volume of the working cylinder during combustion. That is, the fuel combustion temperature is established below the fuel dissociation temperature by expanding the burning mixture into the working cylinder clearance volume by a timed transfer valve. Thus the chemical composition of the engine exhaust products are controlled by establishing combustion temperature below the dissociation temperature and smog-producing constituents are eliminated.

In a conventional combustion engine, the working fluid is compressed and expands in the same cylinder and, as a result, the expansion and compression ratios of the working fluid necessarily are the same. Accordingly, in the conventional engine it is not possible to fully expand the working fluid in the working cylinder, thereby limiting the amount of heat energy in the working fluid which can be converted into mechanical energy. However, with the present invention, the working fluid is compressed outside the working cylinder and therefore the stroke of the working cylinder may be designed to permit substantially-complete expansion of the working fluid, thereby further increasing the efficiency of the cycle of the present invention. That is, with the present invention it is possible to obtain increased expansion per pound of working fluid.

Specifically, the invention comprises a combustion engine cycle in which the working fluid is compressed and supplied to a combustion chamber and heat is added to the working fluid by initial combustion in said chamber. A transfer valve is provided for controlling the admission of the working fluid from said chamber to the working cylinder, thereby permitting substantially-complete expansion of the working fluid. Further the transfer valve is timed in such a manner as to control the combustion temperature, establishing it below the dissociation temperature of the fuel, thereby reducing ignition lag and smog-producing constituents in the engine exhaust. In addition, with this construction, combustion takes place at substantially-constant volume in a chamber separated from the working cylinder and, if the clearance volume between the working piston and its cylinder head is made negligibly small, the efficiency of the cycle of the present invention will approach that of a constant volume cycle having the same expansion ratio.

It should also be noted that, unlike most conventional combustion engine cycles, with the cycle of the present invention, the expansion ratio of the working fluid is not necessarily the same as its compression ratio, but may substantially exceed the compression ratio. Accordingly, by providing for substantially-complete expansion of the working fluid, the efficiency of the cycle of the present invention may even exceed the efficiency of a theoretical constant volume cycle having the same compression ratio. Also, with the construction of the present invention, combustion is initiated in a chamber separated from the working cylinder by a closed transfer valve and therefore the problems related to ignition lag, present in conventional combustion engines, are substantially eliminated with the present invention. Therefore, with the cycle of the present invention it is possible to use cheaper fuels, such as low-grade diesel fuels and even pulverized fuel such as powdered coal.

Other objects of the present invention will become apparent upon reading the annexed detailed description in connection with the drawing in which:

FIGURE 1 is a sectional view taken along line 1—1 of FIGURE 2 of a single cylinder engine embodying the invention;

FIGURE 2 is a sectional view taken along line 2—2 of FIGURE 1;

FIGURE 3 is a sectional view taken along line 3—3 of FIGURE 2;

FIGURE 4 is a diagrammatic view disclosing the valve timing and working sycle of FIGURES 1 to 3;

FIGURE 5 is a sectional view similar to FIGURE 1 of a modified form of the invention;

FIGURE 6 is a sectional view along line 6—6 of FIGURE 5;

FIGURE 7 is a diagrammatic view similar to FIGURE 4 but illustrating the valve timing and working cycle of FIGURES 5 and 6;

FIGURE 8 is a sectional view along line 8—8 of FIGURE 9 and illustrating a modification of FIGURE 1 adapted for use with pulverized fuel;

Figure 10:
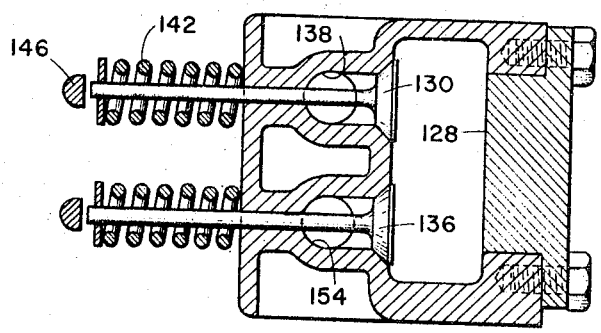

FIGURES 9 and 10 are sectional views respectively taken along line 9—9 and line 10—10 of FIGURES 8 to 10.

Figure 11:
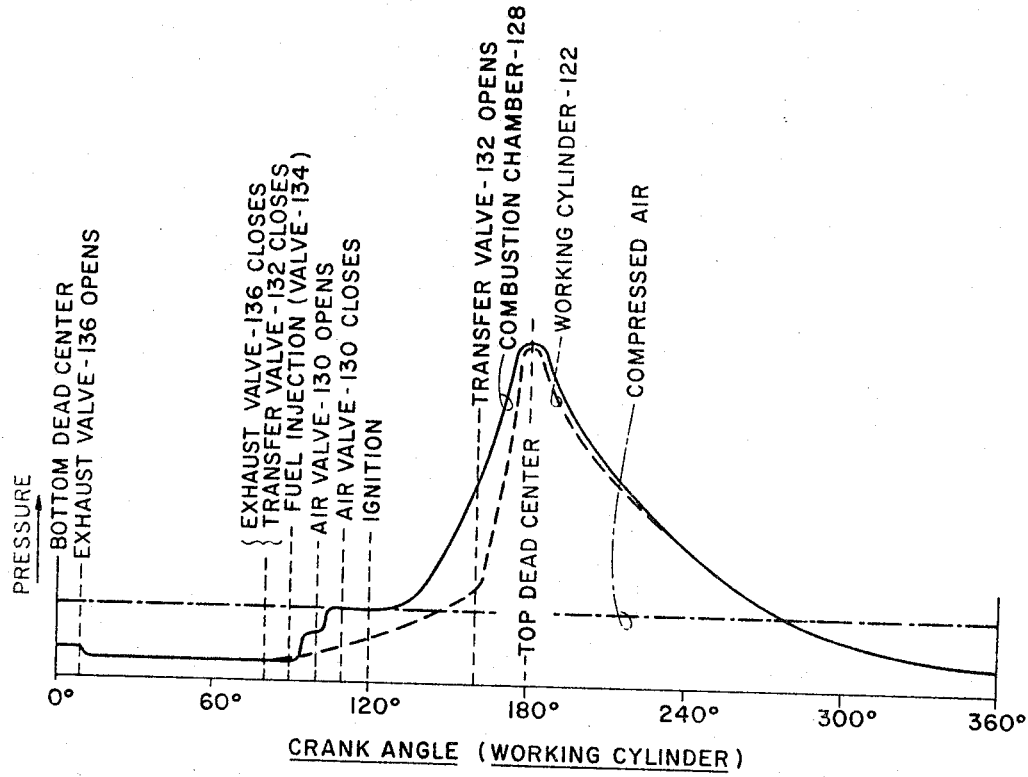

FIGURE 11 is a diagramatic view similar to FIGURE 4 but illustrating the valve timing and working cycle of FIGURES 8 to 10.

Referring first to FIGURES 1 to 3, a two-stroke cycle single-cylinder combustion engine 10 is provided with a cylinder bore 12 and a cylinder block 14 in which a working piston 16 is disposed .The piston 16 is operatively connected to the engine crankshaft 18 by connecting rod 20 in the usual manner. A cam shaft 22 is adapted to be driven at crankshaft speed by gears 24 and 26. The cam shaft 22 is provided with suitable cams 28, 30 and 32 adapted to engage valve tappets 34, 36 and 38 for respectively actuating valves 40, 42 and 44. Suitable springs 46 are provided for urging the valves in a closing direction and a separate chamber 48 is disposed on the cylinder head 50 in communication with valves 40 and 42. For clarity, the size of chamber 48 has been exaggerated on the drawing, e.g. in an engine actually constructed similar to that of FIGURES 1-3, the size of the combustion chamber was approximately equal to the clearance volume above the piston 16 at its top-dead-center position, with the valve 42 closed. Although the engine 10 has been described as a single cylinder engine, obviously the engine may be provided with any desired number of cylinders disposed in-line, radially or in any suitable manner, each of said cylinders having its separate chamber 48 and three valves 40, 42 and 44.

The engine crankshaft 18 is drivably connected to an air compressor, schematically indicated at 51, FIGURE 1, for supplying compressed air at a substantially-constant pressure through passage 53 to the intake port 52, and the valve 40 is disposed so as to control the admission of the compressed air from the intake port 52 to the chamber 48. The chamber 48 is also provided with a conventional fuel injection nozzle 54 to which fuel is adapted to be supplied through conduit 56 for injection into the chamber 48. In addition, a spark plug 58, extending into the chamber 48, is adapted to provide a spark therein for initial ignition of the mixture within the chamber 48. The ignition spark and supply of fuel to nozzle 54 are controlled in a timed relation to the engine crankshaft 18 by conventional means (not shown).

Valve 42, when opened, admits the combustion gases and fuel mixture from chamber 48 through passages 60 and 62 into the working cylinder 12 wherein the gases expand against and do work on the piston 16. Combustion is initiated by the spark plug 58 in the chamber 48 but after chamber 48 reaches the spontaneous ignition temperature of the fuel, the fuel is ignited spontaneously (by auto-ignition), and the spark plug 58 is not required. Combustion is initiated within the chamber 48 then valve 42 opens and combustion continues within the working cylinder. On the upward or return stroke of the piston 16, the valve 44 opens and the piston 16 forces the exhaust gas out through the passage 62 down past the valve 44 into a chamber 64 and out through an exhaust passage 66.

Referring now to FIGURE 4, this figure illustrates the valve timing and working cycle of the engine of FIGURES 1 to 3 in relation to the crank angle as measured from the bottom-dead-center position of the piston 16. Starting with the bottom-dead-center position of the piston 16, that is, with the zero crank angle position, the air intake valve 40 is closed, the transfer valve 42 is open and the exhaust valve 44 is still closed. A few crank angle degrees therefrom, the exhaust valve 44 opens and the pressure within the working cylinder 12 and combustion chamber 48 drops to atmospheric pressure. At approximately the 80° crank angle position, the transfer valve 42 closes and, at approximately the 90° position, fuel injection takes place into the combustion chamber 48 through the nozzle 54. Then, the air intake valve 40 opens at approximately the 100° crank angle position, whereupon the combustion chamber 48 is charged with compressed air. At approximately the 120° crank angle position, the air intake valve 40 closes and, at approximately the 140° position, the exhaust valve 44 closes whereupon further movement of the piston 16 results in compression of the fluid remaining in the cylinder 12. Then, as illustrated, at approximately the 150° crank angle position, the spark plug 58 is energized and ignition takes place within the combustion chamber 48 and, subsequently, at approximately the 160° crank angle position, the transfer valve 42 opens to admit the combustion gases and burning mixture into the working cylinder 12 whereupon the pressure within the combustion chamber 48 and working cylinder 12 builds up as illustrated to the top-dead-center position of the piston and then the combustion gases expand to an extent determined by the stroke of piston 16, for example as illustrated to substantially-atmospheric pressure. The cycle is then repeated. The substantially-constant pressure of the compressed air delivered to the chamber 48 is also indicated on FIGURE 4.

The particular crank angles at which the various valves are operated and the points at which fuel injection and ignition take place obviously may be varied a substantial extent for a given engine, e.g. the ignition point depends largely on the particular fuel being used. However, it is considered preferable that the relation between the points at which the exhaust valve closes, at which ignition takes place and at which the transfer valve 42 opens, be such that the transfer valve opens at a point such that the pressure within the combustion chamber 48 preferably is less than twice the pressure within the working cylinder 12. If the pressure difference between the combustion chamber 48 and the working cylinder 12 is too large when the transfer valve 42 opens, the combustion flame may be momentarily extinguished by the cooling and the rapid transfer of the combustion mixture and flame past the valve 42, thereby tending to cause large fluctuations in pressure within the working cylinder. Extensive tests and investigation with an actual experimental engine, have shown that successful transfer of flame from the combustion chamber 48 to the working cylinder 12 depends on the transferring velocity of the fluid and on the pressure and temperature in the working cylinder 12. It was found that if the pressure in the working cylinder 12 dropped to below one-half the combustion chamber pressure the transferring fluid velocity became so high that flame would not be sustained in it, nor would flame be sustained in it until the pressure in the working cylinder was built up by the transfer of unburned fuel-air mixture. When the pressure built up in the working cylinder to more than one-half the combustion chamber pressure it was found that the flame would proceed through the transfer valve port and ignite the combustible mixture in the working cylinder 12. The pressure in the working cylinder 12 would then build up very rapidly because the mixture was close to chemically correct and the flame speed in it very high. This produced a higher momentary pressure in the working cylinder which prevented any further transfer of combustible fluid from the combustion chamber 48 to the working cylinder 12. As a result the flame in the working cylinder 12 was extinguished and a further build-up of pressure in the combustion chamber 48 was required to force the transfer of sufficient additional combustible fluid into the working cylinder 12 to enrich the mixture to the point where flame was again sustained. It was found that if the pressure in the working cylinder 12 was more than one-half the combustion chamber 48 pressure the transfer of combustible fluid was at a low enough velocity that the flame could be sustained in the moving fluid and thus form a continuous ignition medium for the very lean combustible mixture in the working cylinder 12. Thus combustion was accomplished in both the combustion chamber 48 and working cylinder 12 in such a manner that their respective pressures were increased at steady and approximately equal rates. Pressure fluctuations, in the combustion chamber 48 and working cylinder 12, which caused surging of the combustible fluid through the transfer valve port, were thereby eliminated and a substantial increase in efficiency was realized.

Referring now to FIGURES 5 and 6, in this modification a companion cylinder, disposed alongside the working cylinder, is used to compress the air therefor. As illustrated, an engine cylinder block 70, having a head 72, is provided with a pair of side-by-side cylinders 74 and 76 respectively provided with pistons 78 and 80, each connected to a crankshaft 82 with their crank arms (not shown) disposed 180° apart. A cam shaft 84 is arranged to be driven at engine speed from the crankshaft 82 through gears 86 and 88. The cylinder 76 is provided with a pair of valves 90 and 92 and the cylinder 74 is provided with a pair of valves 94 and 96. Each of the valves is urged in a closing direction by suitable springs and each is adapted to be opened by suitable tappets engageable with the cam shaft 84. A combustion chamber 98 is disposed on the cylinder block head 72 and, as in FIGURES 1 to 3, is provided with a fuel injection nozzle 100 and a spark plug 102.

The arrangement is such that, on the down stroke of piston 80, air is drawn into the cylinder 76 past the open valve 90 through intake port 104 and, on the subsequent upstroke, the air is compressed and near the top of the stroke, the compressed air is admitted through passages 106 and 108 and the air transfer valve 92 into the combustion chamber 98 for combustion therein. Subsequently, after combustion within the chamber 98, the transfer valve 94 for the combustion gases opens and admits the combustion gases through ports 110 and 112 into cylinder 74 wherein the gases expand and do work against the piston 78. Upon the upstroke of the piston 78, the valve 96 opens and the combustion gases are discharged through the port 112 past exhaust valve 96 into a chamber 114 and out through an exhaust port 116.

The valve timing and cycle of FIGURES 5 and 6 is diagrammatically illustrated in FIGURE 7 in relation to the crank angle of the crank arm serving the working piston 78 as measured from its bottom-dead-center position, the angle of the crank arm serving the compressor piston 80 being 180° out of phase therefrom. Then, on the upstroke of the working piston 78, the exhaust valve 96 of working cylinder 74 opens at approximately the 10° position. The intake valve 90 of the compressor cylinder 76 opens when the pressure therein has dropped substantially to atmospheric pressure which, as illustrated, occurs at approximately the 20° position. Then, at approximately the 140° position, the working cylinder exhaust valve 96 closes and at approximately the 150° position, ignition takes place within the combustion chamber 98 and at approximately the 160° position the combustion gas transfer valve 94 opens to admit combustion gases into the working cylinder 74. The gas pressure in the working cylinder 74 and combustion chamber 98 rise until the top-dead-center position of the working piston 78 is reached whereupon the gases expand and do work against this piston. In the meantime, from the top-dead-center position of the working piston 78, the compressor piston 80 begins to compress its air charge, as indicated, its intake valve closing at approximately the 190° position. At approximately the 300° position, the combustion fluid transfer valve 94 closes and, slightly later, fuel is injected into the combustion chamber 98 and, still later, air transfer valve 92 opens to admit the compressed charge from the compressor cylinder 76 into the combustion chamber 98 whereupon the pressure within the cylinder 76 and chamber 98 equalize and at approximately the 360° position, the air transfer valve 92 closes. The intake valve 90 of the compressor cylinder is not opened until the pressure therein has dropped to substantially-atmospheric pressure and the cycle is then repeated.

In the modification of FIGURES 5 to 7, as in FIGURES 1 to 4, the valve timing obviously is subject to considerable variation but, here again, it is desirable that the transfer valve 94 open when the pressure within the combustion chamber 98 is less than twice the pressure within the working cylinder 74.

FIGURES 5 and 6 illustrate a construction to which existing combustion engines can readily be converted by replacing their cylinder heads by the head 72 illustrated in FIGURES 5 and 6 and by modifying the valve, fuel and ignition timing as disclosed for FIGURES 5 and 6. That is, a conventional combustion engine can readily be converted to the cycle of the present invention by substituting a cylinder head 72 as illustrated in FIGURES 5 and 6 and by operating one cylinder for supplying air under pressure to the combustion chamber of the other cylinder of the pair.

In both the modification of FIGURES 1 to 4, as well as in the modification of FIGURES 5 to 7, the air is compressed outside the working cylinder and therefore it is possible to expand the working fluid down to substantially-atmospheric pressure thereby extracting the maximum amount of available energy from said fluid.

In both modifications described, the combustion takes place at substantially-constant volume. Accordingly, if the clearance volume in the working cylinder is negligible, the efficiency of the cycle approaches that of a constant volume cycle having the same expansion ratio. Furthermore, since initial combustion takes place in a separate chamber, the exact point of ignition of the combustion mixture is not as critical as in a conventional combustion engine and therefore the present invention minimizes the usual ignition timing problems. The combustion chamber is not highly stressed and can be operated at a temperature far above the spontaneous ignition temperature of the fuel. That is, after the combustion chamber becomes hot the fuel ignites spontaneously, which in effect reduces the ignition lag of fuel and reduces the unburned hydrocarbons in the engine exhaust, which tend to produce smog. An experimental engine has been built and operated many hours under spontaneous ignition conditions, which was accomplished with gasoline, kerosene, and diesel fuel, indicating this cycle truly produces a multi-fuel engine. The time lag between fuel ignition and actual pressure rise in the working fluid is less important in applicant's cycle than in a conventional combustion engine and therefore it is possible to use cheaper fuels and even a pulverized fuel such as powdered coal. FIGURES 8 to 11, hereinafter described, illustrate a modification of FIGURES 1 to 4 adapted for use of powdered coal and, obviously, FIGURES 5 to 7 may be similarly modified.

In the modification of FIGURES 1 to 4, the air valve 40 may be opened prior to, instead of after, the closure of the transfer valve 42 thereby helping to scavenge the working cylinder. With such a modification, the exhaust gases and scavenge air, remaining in the working cylinder after the exhaust valve 44 closes, are compressed prior to opening of the transfer valve 42. Accordingly, the fuel to air ratio of the mixture in the combustion chamber will be relatively high compared to the ratio of fuel to all the air used per cycle. Therefore, initial combustion will take place in a relatively rich mixture, whereby the tendency of the engine to detonate is decreased. Also excess air can be trapped in the working cylinder clearance volume, which will unite with any unburned hydrocarbons, to burn them completely before they are exhausted to the atmosphere, thus preventing them from forming smog. FIGURES 5 to 7 may be similarly modified.

Accordingly, with the construction of the present invention, as compared to the prior art, it is possible to have an extremely high initial temperature of the combustion mixture, to the point where it will ignite spontaneously, at the same time control fuel dissociation through cooling by controlled expansion of the burning mixture in the working cylinder clearance volume during combustion. That is, the combustion temperature is established just below the fuel dissociation temperature by cooling through expansion, the rate of cooling being controlled by a timed expansion valve. Further, the combustion chamber has a relatively-high degree of turbulence and a rich fuel-air mixture. These factors tend to produce an increase in the combustion flame speed and therefore the tendency of the mixture to detonate is decreased thereby. In addition, this increase in the flame speed of the combustion mixture results in a smaller time lag between fuel ignition and the resulting pressure rise of the working fluid thereby further reducing any ignition timing problems.

The operation of combustion engines becomes quite rough if the pressure rise in the working cylinders, per degree of crank angle travel, becomes too large. With the present invention, as disclosed in FIGURES 1 to 4 and FIGURES 5 to 7, if the engine operation is rough because of an excessive rate of pressure rise of the working fluid within the working cylinder relative to the crank angle travel, this rate of pressure rise and resulting engine roughness may be reduced by decreasing the size of the combustion fluid transfer valve opening, e.g. by changing the magnitude of the movement of the transfer valve. Thus, the present invention has the advantage in that the rate of pressure rise of the working fluid within the working cylinder may readily be controlled by proper design of the actuating cams and/or the size of the valve ports of transfer valves 42 and 94.

In a conventional combustion engine, the working fluid is compressed in the same cylinder in which combustion and expansion of the working fluid takes place and therefore this cylinder becomes quite hot, thereby limiting the mass of air or working fluid taken in on each intake stroke of its associated piston. With the present invention, as disclosed in both the modification of FIGURES 1 to 4 and in the modification of FIGURES 5 to 7, the air is compressed in a compressor which is not subjected to the hot exhaust gases of the engine and therefore, as compared to the prior art, with the present invention considerably-less heat is added to the working fluid by the compressor. Accordingly, with the construction of the present invention, a larger mass of working fluid may be compressed more efficiently because of the higher density and lower temperature of the compressor intake charge.

At this point it should be noted that although, as illustrated in FIGURES 1 to 4 and in FIGURES 5 to 7, the fuel is injected directly into the combustion chamber, it should be obvious that the fuel may be controlled by a carburetor and introduced into the air before it enters the combustion chamber. In addition, instead of using a spark plug for igniting the combustion mixture, the compression ratio of the air may be increased to the point where the resulting air temperature is above the ignition point of the fuel, and the cycle will operate with compression-ignition.

Referring now to FIGURES 8 to 11, an engine is illustrated comprising a single cylinder engine block 120 having a cylinder bore 122 and a piston 124 disposed therein connected to the engine crankshaft (not shown) in the usual manner. A cylinder head 126 on the block 120 provides a separate combustion chamber 128 and valves 130, 132, 134 and 136 control passages communicating therewith. As in the modification of FIGURES 1 to 4, the engine drives a separate compressor which supplies air under pressure to the combustion chamber through intake port 138. This port is controlled by the valve 130 which is urged in a closing direction by a spring 142 and which is adapted to be opened in timed relation to the engine crankshaft by a push rod 144 and a rocker arm 146 operatively interposed between said push rod 144 and valve 130. Valves 132, 134 and 136 are each adapted to be operated in timed relation with the engine crankshaft by a valve similar to the valve gear operatively connected to valve 130.

A pulverized fuel, such as powdered coal, and air under pressure are simultaneously supplied to the combustion chamber 128 through port 148 under the control of fuel valve 134 which, as already described, is operated in timed relation with the engine crankshaft. The structure, whereby powdered coal and compressed air are fed into combustion chamber, may be similar to that disclosed in U.S. Patent No. 1,719,023 or any other conventional powdered coal feeding means may be used for this purpose. Preferably, the combustion chamber 128 is cylindrical, that is a section through this chamber perpendicular to the planes of the drawing of FIGURES 8 to 10 is circular. In this way, the powdered coal tends to swirl upon introduction into the combustion chamber, thereby providing for a uniform mixture of fuel and air therein. The combustion chamber is also provided with a spark plug 150 for ignition of the combustion mixture.

Valve 132 comprises a transfer valve which, when open, admits the combustion gases from the combustion chamber through port 152 into the working cylinder 122 for expansion against the piston 124. Upon the upstroke of the piston 124, the exhaust valve 136 opens and exhaust gases and other products of combustion discharge from the cylinder 122 through the port 152 into the combustion chamber 128 and out through the exhaust port 154. Since the exhaust valve 136 opens into the combustion chamber 128, any ashes or similar products resulting from the combustion of the powdered coal are removed during the exhaust stroke of piston 124, not only from the working cylinder 122, but also from the combustion chamber 128.

As illustrated in FIGURE 11, the valve timing and working cycle of FIGURES 8 to 10 are quite similar to that of FIGURE 1. At the bottom-dead-center position of piston 124, that is at the zero crank angle position, transfer valve 132 is open and exhaust valve 136 and air intake valve 130 are both closed. The exhaust valve 136 opens at approximately the 10° crank angle position and, at approximately the 80° position, the exhaust valve 136 and the transfer valve 132 are closed whereupon the piston 124 begins to compress the gases remaining in the working cylinder 122. At approximately the 90° position, fuel injection valve 134 opens for a short interval to admit powdered coal and air into the combustion chamber. Then, at approximately the 100° crank angle position, air intake valve 130 opens to admit the remainder of the air charge into the combustion chamber 128 and this air valve closes at approximately the 110° position. At the 120° position, ignition takes place and the pressure within the combustion chamber builds up as indicated. Because of the slower ignition time of powdered coal, a large interval is provided in this modification between the point of ignition and the top-dead-center position of the piston. At approximately the 160° position, the transfer valve 132 opens and the combustion gases flow into the working cylinder to build up the pressure therein and, after the piston passes its top-dead-center position, the gases expand and do work on the piston as illustrated in FIGURE 11. The cycle is then repeated.

The valve timing and cycle of FIGURES 8–11 differs from that of FIGURES 1–4 primarily in that, in FIGURES 8–11, the exhaust valve 136 closes prior to fuel injection into the combustion chamber because this valve opens therein, whereas, in FIGURES 1–4, the exhaust valve opens into the working cylinder and therefore can remain open until near the end of the exhaust stroke. The exhaust valve 136 opens into the combustion chamber instead of into the working cylinder in order that substantially all the ashes resulting from the combustion of the powdered coal are removed during each exhaust stroke from both the working cylinder and the combustion chamber. The operation and advantages over the prior art of FIGURES 8–11 are otherwise similar to those of FIGURES 1–4.

I claim as my invention:

1. The method of operating a combustion engine having a member against which the combustion gases impinge for driving said engine; said method comprising the steps of spontaneously igniting the combustion mixture in a high-temperature chamber out of communication with said member; and then placing said chamber in communication with said member at such a time as to establish the said chamber combustion temperature below the dissociation temperature of the fuel and combustion products to said member, during combustion.

2. The method of operating a combustion engine having a piston mounted for reciprocation within a cylinder, said method comprising the steps of causing spontaneous ignition of the combustion mixture in an enclosed high-temperature chamber out of communication with said cylinder, and then placing said chamber in communication with said cylinder at such a time as to establish the said chamber combustion temperature below the dissociation temperature of the fuel and combustion products by controlling expansion of said fuel and combustion products to said cylinder clearance volume, during combustion.

3. The method of operating a two-stroke combustion engine having a piston mounted for reciprocation within a cylinder, said method comprising the steps of supplying a combustion mixture to a high-temperature chamber, causing spontaneous ignition, thereby reducing ignition lag of the mixture, within said chamber while said chamber is isolated from said cylinder, and then placing said chamber in communication with said cylinder for expansion of the combustion gases against said piston at such a time as to establish the said chamber combustion temperature below the dissociation temperature of the fuel and combustion products by controlling expansion of said fuel and combustion products to said cylinder clearance volume, during combustion.

4. A combustion engine comprising a piston slidable within a cylinder and operatively connected to the engine output shaft, means providing a high-temperature chamber, valve means movable to open and close a passage between said cylinder and chamber, means for supplying fuel and air to said chamber for combustion therein, means for spontaneously igniting the fuel-air mixture within said chamber when said valve means is closed, and means for opening said valve means to admit combustion gases from said chamber to said cylinder for expansion against said piston at such a time as to establish the said chamber combustion temperature below the dissociation temperature of the fuel and combustion products by controlling expansion of said fuel and combustion products to said cylinder clearance volume during combustion, thereby reducing fuel ignition lag and eliminating unburned hydrocarbons which produce smog.

5. A combustion engine comprising a cylinder, a piston slidable within said cylinder, a high-temperature combustion chamber, valve means movable for opening and closing a passage between said cylinder and said combustion chamber, means for supplying a rich fuel-air mixture to said combustion chamber for spontaneous combustion to reduce ignition lag therein while said valve means is closed, and means for moving said valve means for opening said passage and admitting combustion gases from said chamber to said cylinder for expansion against said piston at such a time as to establish the said chamber combustion temperature below the dissociation temperature of the fuel and combustion products by controlling expansion of said fuel and combustion products to said cylinder clearance volume, during combustion.

6. A combustion engine comprising a cylinder, a piston slidable within said cylinder, a high-temperature combustion chamber, valve means movable for opening and closing a passage between said cylinder and combustion chamber, means for supplying air under pressure and fuel to said combustion chamber for spontaneous combustion therein while said valve means is closed, and means for moving said valve means for opening said passage and admitting combustion gases from said chamber to said cylinder for expansion against said piston at such a time as to establish the said chamber combustion temperature below the dissociation temperature of the fuel and combustion products by controlling expansion of said fuel and combustion products to said cylinder clearance volume, during combustion.

7. The method of operating a combustion engine having a piston mounted for reciprocation within a cylinder, said method comprising the steps of causing spontaneous ignition of the combustion mixture in an enclosed high-temperature chamber out of communication with said cylinder, effecting compression of the gases and additional combustion air within said cylinder by said piston, and then, after said ignition and compression, placing said chamber into communication with said cylinder at such a time as to establish the said chamber combustion temperature below the dissociation temperature of the fuel and combustion products by controlling expansion of said fuel and combustion products to said cylinder clearance volume during combustion thereby eliminating unburned hydrocarbons by means of combustion with excess air in said cylinder clearance volume, thereby eliminating smog producing engine exhaust gas constituents.

8. A combustion engine comprising a cylinder, a piston slidable within said cylinder, a high-temperature combustion chamber, a valve movable to open and close a passage between said cylinder and combustion chamber, means for supplying fuel and air to said chamber for spontaneous combustion therein, at least the initial stages of said combustion taking place spontaneously while said valve is closed, and means for opening said valve to admit combustion gases from said chamber to said cylinder for expansion against said piston, said valve opening at such a time as to establish the said chamber combustion temperature below the dissociation temperature of the fuel and combustion products by controlling expansion of said fuel and combustion products to said cylinder clearance volume, during combustion.

9. A combustion engine comprising a piston slidable within a cylinder and operatively connected to the engine output shaft, a high-temperature combustion chamber, a first valve movable to open and close a passage between said cylinder and said chamber, an exhaust duct, a second valve movable to control the flow of the cylinder exhaust gases into said duct, both said valves closing before the piston reaches its top-dead-center position, means for supplying fuel and air to said chamber for spontaneous combustion therein, at least the initial stages of said combustion taking place spontaneously while said first valve is closed, and means for opening said first valve to admit combustion gases from said chamber to said cylinder for expansion against said piston, said first valve opening at such a time as to establish the said chamber combustion temperature below the dissociation temperature of the fuel and combustion products by controlling expansion of said fuel and combustion products to said cylinder clearance volume, during combustion.

10. A combustion engine comprising a cylinder, a piston slidable within said cylinder, a high-temperature combustion chamber, a first valve movable to open and close a passage between said cylinder and combustion chamber, an exhaust passage opening into said chamber, a second valve movable to open and close said passage, said valves both being open during the exhaust stroke of said piston, means for supplying fuel and air to said chamber for spontaneous combustion therein, at least the initial stages of said combustion taking place spontaneously while said first valve is closed, and means for opening said first valve to admit combustion gases from said chamber to said cylinder for expansion against said piston, said first valve opening at such a time as to establish the said chamber combustion temperature below the dissociation temperature of the fuel and combustion products by controlling expansion of said fuel and combustion products to said cylinder clearance volume, during combustion.

11. A combustion engine comprising a cylinder, a piston slidable within said cylinder, a high-temperature combustion chamber, a first valve movable to open and close a passage between said cylinder and combustion chamber, an exhaust passage opening into said chamber, a second valve movable to open and close said passage, said valves both being open during the exhaust stroke of said piston, means for supplying air and a pulverized fuel to said chamber for spontaneous combustion therein, at least the initial stages of said combustion taking place spontaneously while said first valve is closed, and means for opening said first valve to admit combustion gases from said chamber to said cylinder for expansion against said piston, said first valve opening at such a time as to establish the said chamber combustion temperature below the dissociation temperature of the fuel and combustion products by controlling expansion of said fuel and combustion products to said cylinder clearance volume, during combustion.

12. In combination, a combustion engine and an air compressor driven thereby, said engine comprising a crankshaft drivably connected to said compressor, a cylinder, a piston slidable within said cylinder and operatively connected to said crankshaft, a high-temperature combustion chamber, a valve movable to open and close a passage between said cylinder and combustion chamber, means for supplying air to said chamber from said compressor, means for supplying fuel to said chamber for spontaneous combustion therein with said air, at least the initial stages of combustion taking place spontaneously while said valve is closed, and means for opening said valve to admit combustion gases from said chamber to said cylinder for expansion against said piston, said valve opening at such a time as to establish the said chamber combustion temperature below the dissociation temperature of the fuel and combustion products by controlling expansion of said fuel and combustion products to said cylinder clearance volume, during combustion.

13. A combustion engine comprising a crankshaft, a pair of cylinders, a pair of pistons each slidable in one of said cylinders and each piston being operatively connected to said crankshaft, a high-temperature combustion chamber, one of the piston-cylinder combinations being operative during engine operation for supplying air under pressure to said chamber, means for supplying fuel to said chamber for at least partial combustion therein with said air, and valve means arranged to open to admit combustion gases from said chamber to the other of said cylinders for expansion against the piston associated therewith, said valve means opening at such a time as to establish the said chamber combustion temperature below the dissociation temperature of the fuel and combustion products by controlling expansion of said fuel and combustion products to said cylinder clearance volume, during combustion.

14. The method of operating a combustion engine having a piston mounted for reciprocation within a cylinder, said method comprising the steps of causing spontaneous ignition of the combustion mixture in an enclosed high-temperature combustion chamber out of communication with said cylinder, and then placing said chamber in communication with said cylinder at such a time as to establish the said chamber combustion temperature below the dissociation temperature of the fuel and combustion products by controlling expansion of said fuel and combustion products to said cylinder clearance volume during combustion, at a time when the pressure within the combustion chamber is greater than the pressure within said cylinder, but less than twice said latter pressure, insuring transfer of the igniting flame from said combustion chamber to said cylinder to provide for smooth combustion, at or near the top-dead-center position of said piston, of the very lean combustion mixture within said cylinder.

15. The method of operating a combustion engine having a pistton mounted for reciprocation within a cylinder, said method comprising the steps of causing spontaneous ignition of the combustion mixture in an enclosed high-temperature combustion chamber out of communication with said cylinder, and then placing said chamber in communication with said cylinder before the top-dead-center position of said piston at such a time as to establish the said chamber combustion temperature below the dissociation temperature of the fuel and combustion products by controlling expansion of said fuel and combustion products to said cylinder clearance volume during combustion, at a time when the pressure within the combustion chamber is greater than the pressure within said cylinder, but less than twice said latter pressure, insuring transfer of the igniting flame from said combustion chamber to said cylinder to provide for smooth combustion, at or near the top-dead-center position of said piston, of the very lean combustion mixture within said cylinder.

References Cited

UNITED STATES PATENTS

| 708,236 | 9/1902 | Leonard | 60—39.6 |
|---|---|---|---|
| 1,130,148 | 3/1915 | Collier | 60—39.62 XR |
| 1,306,596 | 6/1919 | Knudsen | 60—39.6 XR |
| 1,849,347 | 3/1932 | Dale | 60—39.6 |
| 1,998,708 | 4/1935 | Campbell | 123—32.2 |
| 2,227,896 | 1/1941 | Fitzgerald | 60—39.6 XR |
| 2,907,308 | 10/1959 | Meurer et al. | 123—32.2 |

CARLTON R. CROYLE, Primary Examiner.

U.S. Cl. X.R.

60—39.6; 123—1